United States Patent [19]

Cohn

[11] 4,261,387
[45] Apr. 14, 1981

[54] PIPELINE SURGE RELIEF SYSTEM

[75] Inventor: Alan R. Cohn, El Cerrito, Calif.

[73] Assignee: Grove Valve and Regulator Company, Oakland, Calif.

[21] Appl. No.: 80,987

[22] Filed: Oct. 1, 1979

[51] Int. Cl.³ .................................... F16K 31/365
[52] U.S. Cl. .................................... 137/485; 137/568
[58] Field of Search ............ 137/568, 207, 485, 486, 137/488, 492, 116

[56] References Cited

U.S. PATENT DOCUMENTS

| | | | |
|---|---|---|---|
| 3,911,941 | 10/1975 | Gerbic | 137/116 |
| 3,933,172 | 1/1976 | Allen | 137/492 X |
| 3,972,364 | 8/1976 | Brumm | 137/492 X |

*Primary Examiner*—Alan Cohan

*Attorney, Agent, or Firm*—Melvin R. Stidham

[57] ABSTRACT

A pipeline surge relief system including a relief valve of the type that opens when line pressure exceeds pressure in a pilot chamber. A bleed valve, which is operable to evacuate the pilot chamber is opened when pipeline pressure acting against a diaphragm or piston overcomes an opposing reference signal or pressure. The reference pressure is normally maintained at the pipeline pressure by a pressure differential valve which opens to a source of fluid pressure when reference pressure falls below line pressure. However, the differential valve has limited flow capacity so that, in the event of a surge, flow of the reference pressure fluid lags behind the pipeline fluid, whereby reference pressure does not build up as rapidly at bleed valve and is overcome by pipeline pressure to open the bleed valve.

7 Claims, 1 Drawing Figure

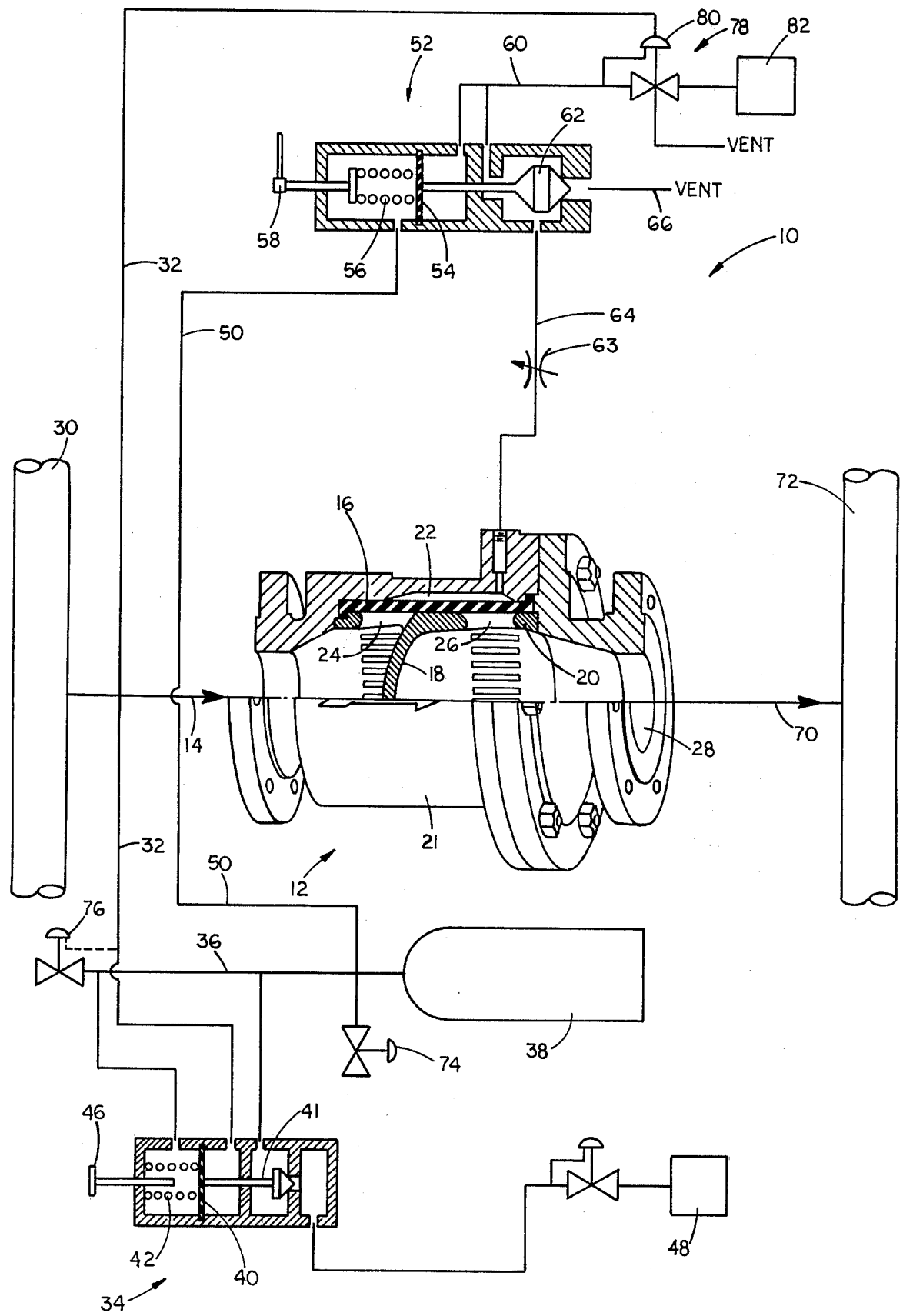

PIPELINE SURGE RELIEF SYSTEM

BACKGROUND OF THE INVENTION

Rapid changes in flow rates in pipelines may produce rapid changes in pressures, or pressure surges, which travel along the pipeline often "snowballing" as they proceed. In some cases, the pressures exceed design pressure limits and must be reduced to avoid damaging the pipeline and creating a serious safety hazard as well as damaging the environment.

One obvious method of relieving such pressure surges is by the installation of fixed pressure relief valve devices. However, such devices are efficient only if situated at a point in the pipeline where the design pressure limits are exceeded. Otherwise, an attempt to anticipate a surge by setting the device to open at a fixed high pressure, which may be indicative of a building surge, though not in and of itself dangerous, could result in unnecessarily relieving high pressure occurences resulting from normal pressure fluctuations. A more reliable parameter is the rate of pressure change and some existing surge relief systems are designed to unload a quantity of fluid from the pipeline to a reservoir in the event that pressure in the pipeline increases at an inordinate rate. However, such systems are dependent upon the operating parameters of the pipeline, and each system must be designed for the particular pipeline in which it is to be installed.

OBJECTS OF THE INVENTION

It is an object of this invention to provide a pipeline surge relief system that will operate effectively in any pipeline installation.

It is a further object of this invention to provide a pipeline pressure surge relief system which is actuated by pressure in the pipeline itself.

It is a further object of this invention to provide a pipeline surge relief system which will operate to relieve all surges as indicated by a predetermined rate of pressure increase.

Other objects and advantages of this invention will become apparent from the description to follow, particularly when read in conjunction with the accompanying drawing.

SUMMARY OF THE INVENTION

In carrying out this invention, there is provided a main surge relief valve of the type which opens when line pressure overcomes pressure in a control chamber. A bleed valve opens to evacuate the control chamber to the downstream line or some other zone of low pressure when the line pressure exceeds the reference pressure by an amount determined by the setting of a spring force against a diaphragm or piston against which the two pressures are asserted. Normally, the reference pressure is maintained at pipeline pressure by means of a pressure differential pilot valve that opens to a source of reference fluid at high pressures whenever line pressure exceeds the reference pressure. When this occurs, the valve throttles flow to a control volume chamber which is, in turn, connected to a sensing element of the bleed valve. However, when the pipeline pressure increases at a rate fast enough to indicate a surge, the reference valve, though opened to its full extent, restricts flow through to an extent that the reference pressure lags behind the surging pipeline fluid pressure, as does its affect on the bleed valve diaphragm, causing the bleed valve to open and evacuate the pilot chamber of jacket. As a result, the main relief valve opens and dumps a quantity of pipeline pressure fluid to a reservoir until the surge is relieved.

BRIEF DESCRIPTION OF THE DRAWING

The drawing is a schematic illustration of a pipeline surge relief system embodying features of this invention.

DESCRIPTION OF A PREFERRED EMBODIMENT

Referring now to the drawing with greater particularity, the surge relief system 10 of this invention is adapted to be used with a surge relief valve 12 of the type that opens when upstream pressure overcomes pressure in a control chamber or jacket. For example, in the expansible tube valve 12 shown, pressure in the upstream line 14 acts against the inside of a flexible tube 16 which is stretched around a barrier 18 in a core or cage 20 within the valve body 21. When the differential between line pressure and the pressure in a jacket 22 surrounding the tube 16 increases to a level sufficient to overcome the hoop tension in tube 16, the tube will stretch outward to enable flow through upstream slots 24 and around the barrier 18 back through downstream slots 26 and out the downstream flow passage 28.

In the surge relief system 10 of this invention, pressure in the pipeline 30 is directed through duct 32 to a pressure differential pilot 34 where it is compared against a reference pressure in line 36 from a reference volume chamber 38.

In the pressure differential pilot 34, a diaphragm 40 controls a valve member 41, with a spring 42 biasing the valve member 41 toward closed position shown. An adjustable stop member 46 determines the full open position of the valve member 41, and is set to be reached when the rate of pressure increase reaches a predetermined level or set rate. The reference pressure in line 36 is introduced on the side of the diaphragm to bias the valve 41 toward closed position, and pipeline pressure in line 32 is asserted against the other side of the diaphragm to bias the valve open. A spring 42 assures valve closing when the pressures are in balance.

Where the pipeline pressure in line 32 exceeds the reference pressure, the valve member 41 is moved away from its seat to allow pressure fluid from a high pressure source of supply 48 to flow through the valve 34 and line 36, to build the reference pressure up to the level of the pipeline pressure at which point, the valve 34 closes again. Hence, in normal operation the reference pressure balances the pipeline pressure.

The reference pressure in chamber 38 is directed through line 50 to a second pressure differential pilot 52 and is there asserted against the side of a diaphragm 54 to bias the bleed valve 62 toward closed position. The reference pressure is aided by a spring 56, the initial force of which is adjusted at 58. Pipeline pressure from lines 32 and 60 acts against the other side of the diaphragm and in absence of a surge the bleed valve 62 remains closed.

Where the rate of pipeline pressure increases at a rate less than the set rate, the valve 34 just opens enough to allow a small amount of flow to bring the pressures acting against the diaphragms 40 and 54 in balance again.

However, where the rate of pressure increase in the pipeline 30 exceeds the set rate, indicative of a surge, the pressure differential control valve 34 opens fully against its adjustable stop 46 and this generates a specific, predetermined rate of flow, and hence, rate of pressure increase in the reference volume chamber 38 and reference line 50. Since, at surge conditions, the predetermined rate of pressure increase in the reference line 50 is less than the rate of pipeline pressure increase in line 60, the valve 62 will be opened by the line pressure acting against the diaphragm 54, allowing the jacket 22 of the main surge relief valve 12 to bleed through orifice 63 and lines 64 and 66 to some low pressure.

With the jacket 16 bled, the valve 12 opens to dump a quantity of fluid at pipeline pressure through line 70 to the reservoir 72. When the pressure in pipeline 30 is again reduced to the reference pressure, the pilot 52 is again closed allowing pipeline pressure in line 60 to build up the pressure in the jacket 16 through line 64, until the main relief valve 12 is again closed.

When the pipeline pressure reaches the maximum allowable operating pressure, even though the rate of rise is within the acceptable limits of the system 10, a relief valve 74 which is set at this maximum pressure, will open, reducing the reference pressure in reference chamber 38 and causing the pilot 52 to open as previously described, so that a quantity of fluid from pipeline 30 will be dumped to the reservoir 72 until the pressure in pipeline 30 is reduced to an acceptable level. The capacity of the relief valve 74 is greater than that of the reference valve 34 so that the reference valve will not nullify the relieving action of the valve 74.

In the event the pipeline pressure falls below the reference pressure a back pressure regulator 76 will open to bleed the reference volume 38 down to the level of the line pressure.

The valve 78 in pipeline tap line 32 is a combination pressure reducing-back pressure regulator. The dome 80 of this valve is loaded with line pressure and acts as an interface with the line fluid and the actuating gas from a source of supply 82. The valve 78 is conditioned to open to the source 82 if pressure fails below pipeline pressure and it opens to vent if pressure exceeds line pressure. Hence, the system 10 is operated at line pressures but with a separate fluid medium, i.e. gas from a suitable supply 82.

While this invention has been described in conjunction with a preferred embodiment thereof, it is obvious that modifications and changes therein may be made by those skilled in the art without departing from the spirit and scope of this invention, as defined by the claims appended hereto.

What is claimed as invention is:

1. A pipeline surge relief system comprising:
a conduit adapted to be connected between a pipeline and a reservoir;
a relief valve of the type that opens when line pressure exceeds pressure in a control chamber connected in said conduit;
a bleed duct connecting the control chamber of said relief valve to a zone of low pressure;
a first pressure differential pilot valve connected in said bleed duct so that when opened said control chamber is bled downstream of said relief valve;
a pressure-responsive, movable member controlling said first pilot valve;
first duct means directing fluid at pipeline pressure to said movable member to open said first pilot valve;
a source of reference pressure fluid;
a second duct means directing said reference fluid to said movable member to close said first pilot valve;
a reference valve in said second duct means having maximum flow capacity to increase pressure in said second duct means at a rate less than a rate of pressure increase characteristic of a pipeline surge; and
means opening said reference valve in response to a surge in the pipeline.

2. The surge relief system defined by claim 1 wherein said last-named means comprises:
a comparative pressure-responding control member controlling said reference valve;
a reference volume chamber connected to said second duct means;
third duct means directing fluid a pipeline pressure to said control member to bias said reference valve open; and
means connecting said second duct means to said control member to bias said reference valve closed.

3. The surge relief system defined by claim 2 including:
spring means biasing said control member to urge said reference valve closed; and
adjustable stop means to determine the full open condition of said reference valve.

4. The surge relief system defined by claim 1 including:
means connecting fluid at pipeline pressure to the control chamber of said relief valve when said first pilot valve is closed.

5. The surge relief system defined by claim 3 including:
a pressure relief valve in said second duct means of a greater flow capacity than said reference valve.

6. The surge relief system defined by claim 3 including:
a back pressure regulator in said second duct means conditioned to open when pressure therein exceeds pipeline pressure.

7. The surge relief system defined by claim 4 including:
a source of gas;
a supply line connecting said first duct means and said fluid connecting means to said source of gas; and
a pressure control valve in said supply line conditioned to maintain pressure therein at pipeline pressure.

* * * * *